US009239894B2

United States Patent
(12) Zou et al.

(10) Patent No.: US 9,239,894 B2
(45) Date of Patent: Jan. 19, 2016

(54) SYSTEMS AND METHODS FOR PREDICTING FAILURES IN POWER SYSTEMS EQUIPMENT

(75) Inventors: Tong Zou, Greenville, SC (US); Yogesh Agarwal, Bangalore (IN)

(73) Assignee: General Electric Company, Schenectady, NY (US)

( * ) Notice: Subject to any disclaimer, the term of this patent is extended or adjusted under 35 U.S.C. 154(b) by 608 days.

(21) Appl. No.: 13/556,093

(22) Filed: Jul. 23, 2012

(65) Prior Publication Data

US 2014/0025363 A1 Jan. 23, 2014

(51) Int. Cl.
*G06F 17/50* (2006.01)

(52) U.S. Cl.
CPC ........ *G06F 17/5009* (2013.01); *G06F 2217/76* (2013.01); *G06F 2217/78* (2013.01)

(58) Field of Classification Search
None
See application file for complete search history.

(56) References Cited

U.S. PATENT DOCUMENTS 5,675,480 A * 10/1997 Stanford ......................... 307/58
6,167,525 A * 12/2000 Donazzi et al. .............. 361/93.8
6,472,818 B1 * 10/2002 Ikeda et al. ................... 313/558
6,799,154 B1 9/2004 Aragones et al.
6,832,205 B1 12/2004 Aragones et al.
7,107,491 B2 9/2006 Graichen et al.
8,413,095 B1 * 4/2013 Dubuque et al. .............. 716/113
8,897,968 B2 * 11/2014 Suzuki ............................ 701/43
2002/0078403 A1 * 6/2002 Gullo et al. ..................... 714/37
2004/0117051 A1 * 6/2004 Ford .............................. 700/109
2008/0040621 A1 * 2/2008 Smith ........................... 713/300
2008/0155441 A1 * 6/2008 Long et al. .................... 715/771
2009/0234980 A1 * 9/2009 Barrenscheen et al. ........ 710/18
2010/0115335 A1 * 5/2010 Wylie et al. ..................... 714/25
2010/0198635 A1 * 8/2010 Pirtle et al. ........................ 705/7
2010/0287411 A1 * 11/2010 Montrone ........... G06F 17/5009 714/33
2012/0143565 A1 * 6/2012 Graham et al. ............... 702/181
2012/0290104 A1 * 11/2012 Holt et al. ....................... 700/29
2013/0041783 A1 * 2/2013 Jyoti et al. ....................... 705/28
2013/0197875 A1 * 8/2013 Shirley ............ G01R 31/31718 703/2
2014/0163759 A1 * 6/2014 Anderson et al. ............. 700/291
2015/0100284 A1 * 4/2015 Teravainen ........... G06F 17/504 703/2

FOREIGN PATENT DOCUMENTS

EP 1146468 A2 10/2001

OTHER PUBLICATIONS

V. Chaluvadi, "Accelerated Life Testing of Electronic Revenue Meters", pp. 1-119, 2008.*

* cited by examiner

*Primary Examiner* — Kibrom K Gebresilassie
(74) *Attorney, Agent, or Firm* — Sutherland Asbill & Brennan LLP

(57) ABSTRACT

Certain embodiments herein are directed to systems and methods to predict failures in power systems equipment. In one embodiment, one or more life-span models associated with power systems equipment may be received. Examples of such life-span models may include a left-censoring model, a right-censoring model, and an interval-censoring model. An accuracy of the life-span models may be determined based at least in part on statistical analysis, such as a Weibull distribution analysis. A stability of the life-span models may also be determined, in certain embodiments herein.

14 Claims, 3 Drawing Sheets

300

RECEIVE LIFE-SPAN INFORMATION 302
DETERMINE DISTRIBUTION MODEL 304
GENERATE FAILURE TIME 306
DETERMINE OUTAGE DISTRIBUTION 308
GENERATE OUTAGE TIMES 310
GENERATE INPUT FILE 312
CALCULATE STATISTICAL PARAMETERS 314
COMPARE STATISTICAL PARAMETERS AGAINST MODEL 316
DETERMINE ACCURACY OF LIFE-SPAN MODELS 318
DETERMINE STABILITY OF LIFE-SPAN MODELS 320

SYSTEMS AND METHODS FOR PREDICTING FAILURES IN POWER SYSTEMS EQUIPMENT

TECHNICAL FIELD

Embodiments of the disclosure relate generally to data modeling and, more particularly, to systems and methods for predicting failures in power systems equipment.

BACKGROUND OF THE DISCLOSURE

Power systems equipment may experience one or more failures during the course of its operation. Such failures may escape detection until power systems are inspected. The time of such inspection, however, may not be the actual time that the failure occurred, as assumed by existing models. Other models that may be presumed to be more accurate at predicting failures have escaped verification of their accuracy. Therefore, it is unknown how well existing models may predict failures, such as those experienced in power systems equipment.

BRIEF DESCRIPTION OF THE DISCLOSURE

Some or all of the above needs and/or problems may be addressed by certain embodiments of the disclosure. Certain embodiments may include systems and methods for predicting failures in power systems equipment. According to one embodiment, there is disclosed a system including at least one memory that stores computer-executable instructions and at least one processor configured to access the at least one memory and execute the computer-executable instructions to receive at least one life-span model associated with power systems equipment and store the at least one life-span model in the at least one memory, determine an accuracy of the at least one life-span model based at least in part on a statistical analysis, and determine a stability of the at least one life-span model.

According to another embodiment, there is disclosed a method for receiving, by an input device of a computing device, one or more life-span models associated with power systems equipment and storing the one or more life-span models in memory. The method may also include determining, by at least one processor of the computing device, an accuracy of the one or more life-span models based at least in part on a statistical analysis, and determining a stability of the one or more life-span models.

According to a further embodiment, there is disclosed a method for receiving, from periodic inspection, life-span data associated with a part of a power system, determining a distribution model based at least in part on the data, generating an input file for a statistical analysis, calculating a statistical parameter based at least in part on the generated input file, comparing the calculated statistical parameter against the determined distribution model, and determining an accuracy of the determined distribution model based at least in part on the comparison.

Other embodiments, systems, methods, apparatuses, aspects, and features of the disclosure will become apparent to those skilled in the art from the following detailed description, the accompanying drawings, and the appended claims.

BRIEF DESCRIPTION OF THE FIGURES

The detailed description is set forth with reference to the accompanying drawings, which are not necessarily drawn to scale. The use of the same reference numbers in different figures indicates similar or identical items, in accordance with an embodiment of the disclosure.

Figure 1:
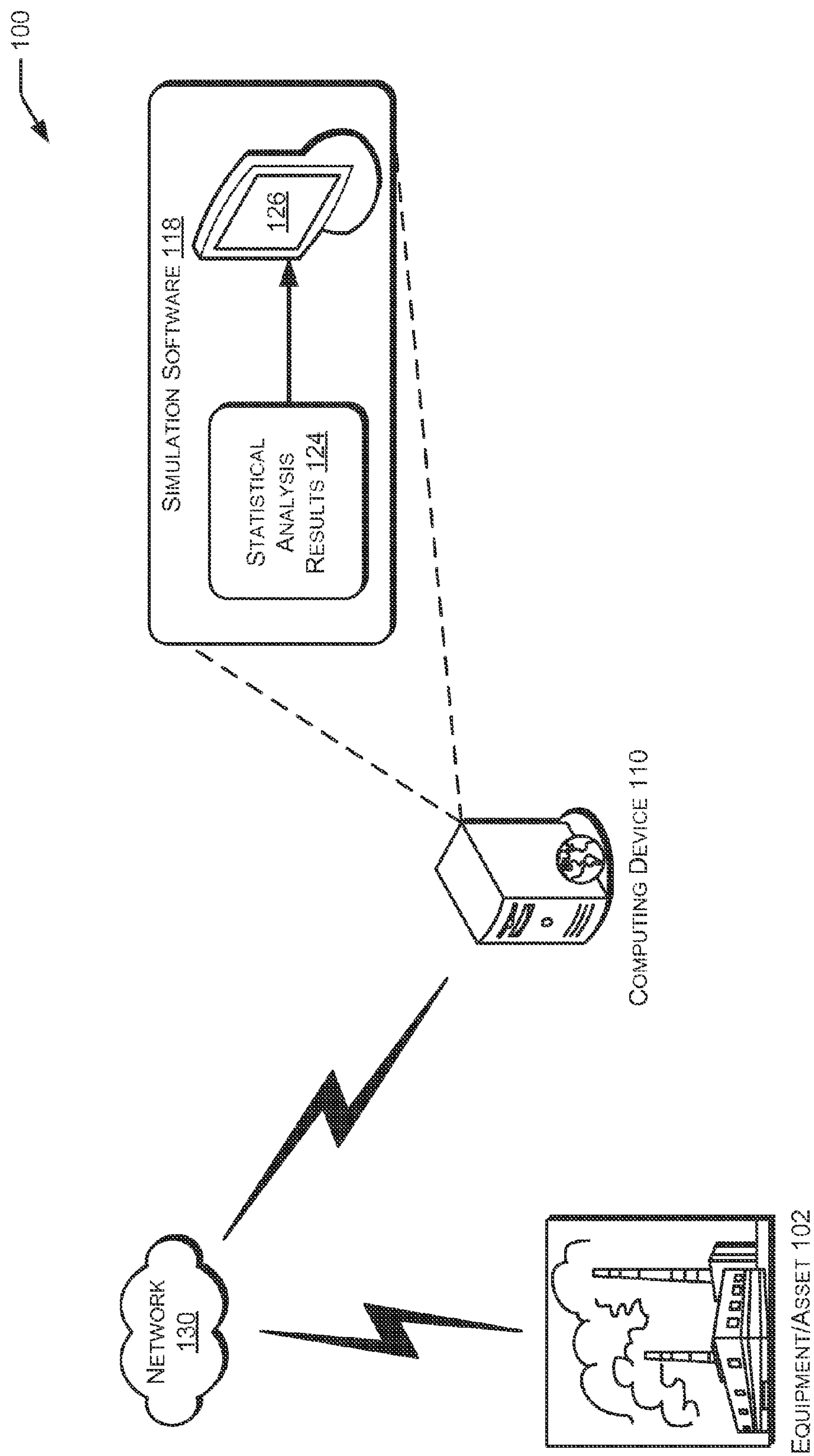
FIG. 1 illustrates an example power generation system according to one embodiment of the disclosure.

Certain implementations will now be described more fully below with reference to the accompanying drawings, in which various implementations and/or aspects are shown. Various aspects may, however, be implemented in many different forms and should not be construed as limited to the implementations set forth herein. Like numbers refer to like elements throughout.

DETAILED DESCRIPTION OF THE DISCLOSURE

Illustrative embodiments will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements.

Illustrative embodiments herein are directed to, among other things, generating a model to predict failures in power systems equipment. A failure in power systems equipment may be deemed to have occurred when the equipment is no longer operating as intended. One or more models may be generated to predict such failures. According to certain embodiments herein, the models may be life-span models, such as a left-censoring model, a right-censoring model, and an interval-censoring model, as non-limiting examples. Each of these models may yield different results based at least in part on the assumptions that underlie these models. For example, the left-censoring model may assume that failures occur at the beginning of operation of power systems equipment, the right-censoring model may assume that a failure occurs at the time of inspection of power systems equipment (referred to hereinafter as the theoretical model), and the interval-censoring model may assume that a failure occurs at some time between the beginning of operation of a piece of power systems equipment and the time of inspection.

A Weibull distribution analysis used in combination with a Monte Carlo simulation may be used to determine an accuracy and stability for each of the life-span models, according to one embodiment. To determine the accuracy, random failure times (e.g., presumed time of failure of power systems equipment based on historical failures) and random outage times (e.g., based on design recommendations for inspecting power systems equipment) may be generated, and Weibull distribution parameters may be determined or selected for generating a distribution of the randomly generated failure times and outage times. Weibull calculations may be performed for each life-span model's representation of the failure and outage data, and the calculated values may be compared to the randomly generated values (e.g., based on the known historical failures) to determine an accuracy for each life-span model.

In embodiments in which the interval-censoring model is determined to be more accurate than other models, a degree of accuracy for the interval-censoring model may be determined. A stability of the interval-censoring model may also be determined. For example, an interval-censoring model that has a statistical distribution parameter (e.g., Beta) that varies by less than a threshold percentage may be considered a stable model and, therefore, may be used to predict failures in power systems equipment.

The technical effects of certain embodiments herein may include, but are not limited to, improved accuracy in predicting failures in power systems equipment, which may facilitate proper allocation of power systems resources and more cost-effective contracts associated with purchasing power systems equipment.

FIG. 1 depicts an example power generation system 100 according to one embodiment of the disclosure. As shown in FIG. 1, power generation equipment 102 and a computing device 110 may be connected to one or more wired and/or wireless networks 130, including the Internet. In other embodiments, other networks, intranets, or combinations of networks may be used. Other embodiments may not involve a network but may, for example, describe devices that are directly connected to one another, e.g., the computing devices 110 may be directly connected to a piece of power generation equipment.

The computing device 110 may include simulation software 118, such as a Monte Carlo simulation, as a non-limiting example. In one embodiment, the determination of accuracy and stability of a life-span model may be based at least in part on the Monte Carlo simulation. The simulation software 118 may generate and display statistical analysis results 124 on a display 126 associated with the computing device 110. A Monte Carlo simulation, as used herein, may refer to a class of computational algorithms that may rely on repeated random data points, such as data points associated with power systems equipment failures, to compute their results. As will be described in greater detail below, such data may be received by the computing device 110 over a network 130, and utilized by the simulation software 118 and various other techniques including, but not limited to, life-span model analysis and Weibull distributions to determine an accuracy and stability of the life-span models for use in predicting failures in power systems equipment.

Figure 2:
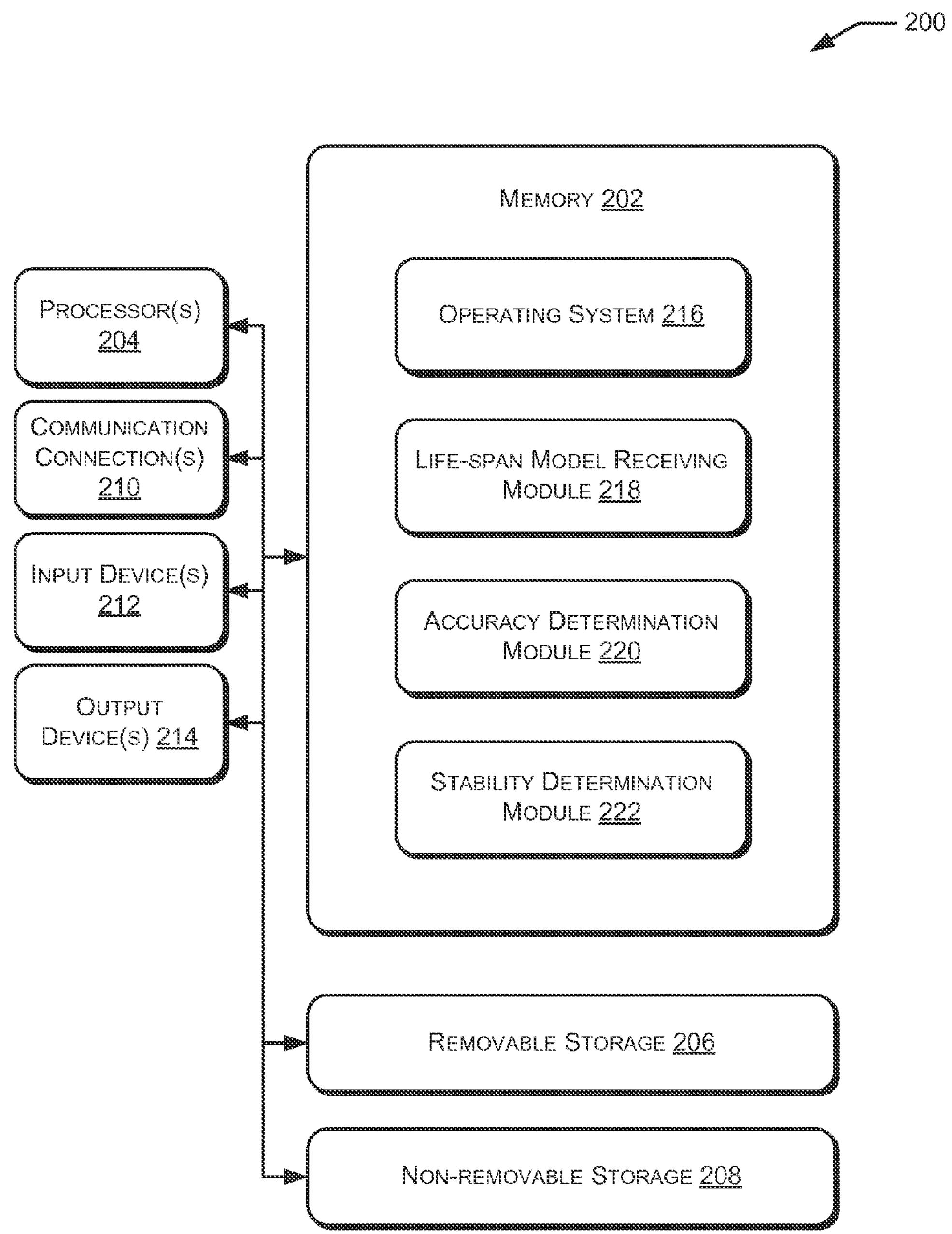
FIG. 2 illustrates an example computing environment for generating a model for predicting failures associated with power generation systems, according to one embodiment of the disclosure.

FIG. 2 depicts an example computing environment according to one embodiment of the disclosure. The computing environment 200 may include, but is not limited to, a computing device which may include a processor 204 capable of communicating with a memory 202. The processor 204 may be implemented as appropriate in hardware, software, firmware, or combinations thereof. Software or firmware implementations of the processor 204 may include computer-executable or machine-executable instructions written in any suitable programming language to perform the various functions described. Examples of computing devices may include a personal computer, mainframe, web server, mobile device, or any processor-based device capable of executing instructions to perform the functions described in the embodiments herein.

A memory 202 may store program instructions that are loadable and executable on the processor 204, as well as data generated during the execution of these programs. Depending on the configuration and type of computing environment 200, a memory 202 may be volatile (such as random access memory (RAM)) and/or non-volatile (such as read-only memory (ROM), flash memory, etc.). The computer device may also include additional removable storage 206 and/or non-removable storage 208 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 202 may include multiple different types of memory, such as static random access memory (SRAM), dynamic random access memory (DRAM), or ROM.

The memory 202, removable storage 206, and non-removable storage 208 are all examples of computer-readable storage media. For example, computer-readable storage media may include volatile and non-volatile, removable and non-removable media implemented in any method or technology for storage of information such as computer-readable instructions, data structures, program modules, or other data. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the computer device. Combinations of any of the above should also be included within the scope of computer-readable media.

In other embodiments, however, computer-readable communication media may include computer-readable instructions, program modules, or other data transmitted within a data signal, such as a carrier wave, or other transmission. As used herein, however, computer-readable storage media does not include computer-readable communication media.

The computing environment 200 may also contain one or more communication connections 210 that allow the computer device to communicate with other devices capable of communicating with a computing device. The communication connections 210 may be established via a wired and/or wireless connection between a computing device and a piece of power systems equipment, in one embodiment. The connection may involve a network such as the Internet or may be a direct connection (i.e., excluding a network) between the computer device and the equipment, according to various embodiments. The computing environment 200 may also include one or more input devices 212, such as a keyboard, mouse, pen, voice input device, and touch input device. It may also include one or more output devices 214, such as a display, printer, and speakers.

Turning to the contents of the memory 202 in more detail, the memory 202 may include an operating system 216 and one or more application programs or services for implementing the features and aspects described herein, including a life-span model receiving module 218, an accuracy determination module 220, and a stability determination module 222.

The life-span model receiving module 218 may receive at least one life-span model associated with power systems equipment and store it, e.g., in a memory 202, in one embodiment. Example life-span models may include, but are not limited to, a left-censoring model, a right-censoring model, a complete-censoring model, and an interval-censoring model, or other censoring models that may be applied when the value of a measurement or observation, such as a power equipment failure, is partially known. In one embodiment, left-censoring may describe a measurement that is below a certain value but it is unknown by how much, right-censoring may describe a measurement that is above a certain value but it is unknown by how much, and interval-censoring may describe a measurement that is at some point on an interval between two values, e.g., the left-censoring value and the right-censoring value.

The life-span model receiving module 218 may also receive information associated with power systems equipment, such as a part or component of a power system, in certain embodiments. The accuracy determination module 220 may determine an accuracy for each of the received life-span models based at least in part on the information associated with the power systems equipment, in one embodiment. In one aspect of the embodiment, the determination may be based at least in part on a statistical analysis, such as a Weibull analysis, or another as a continuous probability distribution. In using a Weibull analysis, the accuracy determination module 220 may determine Weibull distribution parameters, such as Beta and Eta. The Beta value may determine the shape of the distribution and may represent the failure rate behavior of a life-span model, while the Eta value may represent a location or characteristic value of a failure.

In one example, the Beta value and the Eta value may be randomly selected to represent actual failures, to which one or more simulated failures may be compared, for example, using a Monte Carlo simulation, to determine the accuracy of a model based on the actual failures. In one embodiment, a user may hypothetically select Beta and Eta values to represent actual failures in the simulation.

As part of the accuracy determination performed by the accuracy determination module 220, failure times for various power systems equipment or parts may be generated. The generated failure times may be based at least in part on historical failures associated with power generation equipment (which may have been discovered during previous inspections of power systems equipment), design specifications for power systems equipment, risk prediction data, and/or other data that may identify failure rates, patterns, tendencies, etc., of power systems equipment. Generated failure times may be based on one or any combination of these data, which may be averaged, summed, or calculated using various mathematical operations and/or techniques to generate a series of data points representing failures in power systems equipment. In one embodiment, the historical failures may be based on failures that may have been discovered during scheduled maintenance inspections.

The accuracy determination module 220 may also determine an outage distribution associated with the generated failures. The outage distribution may indicate a time at which power systems equipment may be recommended for inspection by design or manufacturer specifications, or actual historical inspection times for power systems equipment, as non-limiting examples. Each part or component of a power system may have a different outage distribution. Recommended inspection times may be provided by a manufacturer of power systems equipment and may include a duration which, when reached, may suggest that an inspection of power systems equipment should be performed. Examples of such inspection times may include approximately once every 16,000 hours, 24,000 hours, 28,000 hours, etc., as non-limiting examples. In other embodiments, the outage distribution time may be based on ad-hoc scheduled inspection times, which may be based on an observation of a degradation of service or performance associated with power systems equipment, or other determinations.

The accuracy determination module 220 may generate a series of data points representing outage times along the determined outage distribution. In one embodiment, a sufficient number of outage times may be generated such that each of the randomly generated failures may be recognized in the Weibull analysis. For example, if the generated failure times described above are equivalent to approximately 10-, 20-, 30-, and 40-hours, then, to identify the approximate 40-hour failure time in a Weibull calculation, at least one outage generation time of greater than or equal to approximately 40-hours may be required, e.g., to represent an inspection time, or a time at which failures (which likely occurred some time before inspection) may be discovered. According to certain embodiments, therefore, both the generated failure times and the generated outage times may be represented as a series of points, both of which may serve as inputs into different censoring models in an accuracy determination for each of the models.

Upon generating the different censoring models based at least in part on the generated failure and outage data, the accuracy determination module 220 may generate a respective input file that may represent the application of the different censoring models to the data. In this way, the life-span models may be based at least in part on risk prediction data associated with power systems equipment, in one embodiment. In one aspect of an embodiment, the input file may include an interval-censoring input file, a left-censoring input file, a right-censoring input file, and a not-censoring input file.

The accuracy determination module 220 may further perform a Weibull analysis to calculate Weibull parameters, e.g., Beta and Eta, based at least in part on the generated input files. The calculated Weibull parameters may be compared against the determined distribution model, for example, compared to the actual Weibull parameters as determined randomly by the accuracy determination module 220 or based on user-specified parameters. For example, a Beta value and an Eta value for each of the life-span models may be compared to the actual Beta values and Eta values to determine an accuracy for each of the life-span models. In other embodiments, the determination of the accuracy of a life-span model as performed by the accuracy determination module 220 may include comparing the life-span model, e.g., based on actual Beta and Eta values, to the theoretical model, which may assume that failures in power systems equipment occur at the time of inspection. In this way, determining an accuracy of the determined distribution model may be based at least in part on the comparison between the calculated statistical parameters, e.g., the Beta and Eta values, and the determined distribution model.

According to certain embodiments, the interval-censoring model may be more accurate than the left-censoring model and the right-censoring model, which may be indicated by a Beta value that is closer to the actual value of a failure than the Beta value associated with the left-censoring model or the right-censoring model. In one example, the percentage difference between the Beta value associated with the interval-censoring model and the actual Beta value may be less than one percent, whereas the difference between such values associated with the left-censoring model and the right-censoring model may be greater than one percent.

The stability determination module 222 may determine whether a life-span model is stable. According to certain embodiments, an interval-censoring model, which may be determined to be more accurate than the left-censoring model and the right-censoring model, may be analyzed to determine whether the interval-censoring model is stable. To determine whether a model is stable, according to one embodiment, the stability determination module 222 may receive multiple randomly generated failure start times. The stability determination module 222 may generate the failure start times, or it may receive such times from a user, according to various embodiments. The failure start times may be different from the failure times used in the accuracy determination performed by the accuracy determination module 220. For example, the failure start times may not be based on design or manufacturer specifications but may be based on randomly generated time intervals that may be sufficient to identify variations in statistical parameters over time, according to one embodiment. Example failure start times may include approximately 0-hours, 1-hour, 10-hours, 20-hours, and every additional ten hours up to the earliest failure (e.g., as identified at the time of inspection, in one embodiment). Any randomly generated, user-specified, or other generated values, patterns, etc., may be used to indicate failure start times in an analysis to determine the stability of a model, in other examples.

The stability determination module 222 may identify a Beta value associated with initial parameters, such as failure start times. In one embodiment, the determination of the stability of a life-span model may include comparing a Beta value of a life-span model parameter. For example, in one embodiment, as the stability determination module 222 varies the failure start times (e.g., alters them from approximately 0-hours to 1-hour to 10-hours, etc.), the stability determination module 222 may capture a respective Beta value for each of the failure start times and analyze at least a portion of the failure start times to determine whether a model is stable. For example, in one embodiment, the stability determination module 222 may analyze the Beta values associated with initial parameters, such as a number of failure start times (e.g., three). If the Beta values associated with the initial parameters vary by less than a one percent threshold, in one example, then a determination may be made that the model is stable, and a model (e.g., an interval-censored model) may be recommended. In one example, a model associated with the first failure time of the initial failure start times (e.g., failure start time equals one in a subset of initial failure start times including approximately one, ten, and one-hundred hours) may represent the best model for predicting failures associated with power systems equipment. The Beta value associated with the first failure time may also be used to indicate the shape of the Weibull distribution, which may also be used to predict failures in power systems equipment.

According to another example, if the Beta values vary by more than one percent for a determined number of initial parameters, but stabilize or converge as the given set of initial parameters increases, then the model may be considered to be stable. According to this example, a distribution model with at least one initial parameter associated with a converged Beta may be recommended. If the Beta values for the set of initial parameters are greater than the one-percent threshold and the Beta values do not converge as the failure start times increase, then the distribution model may be considered to have a stability problem, and a model at a higher or lower level of initial parameters may be determined, or a model associated with a predetermined Beta value.

The above examples are non-limiting. Fewer or more failure times, outage times, failure start times, smaller or larger thresholds used to determine whether a life-span model is stable, and/or other criteria and/or analysis techniques may be used to determine accuracy and stability for a life-span model for use in predicting failures in power systems equipment.

Figure 3:
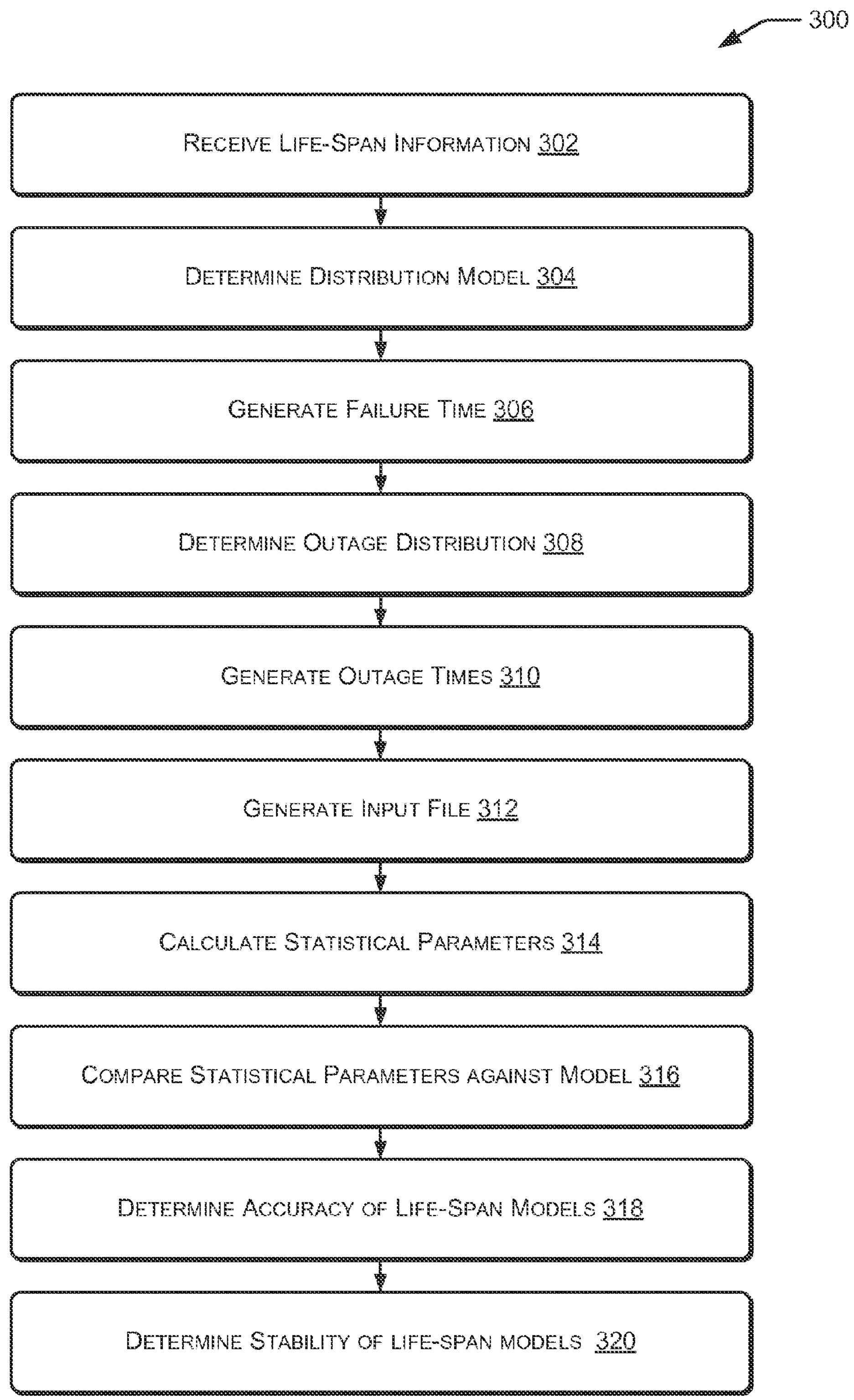
FIG. 3 depicts an example flow diagram for a method according to one embodiment of the disclosure.

FIG. 3 is an example flow diagram illustrating details of a method 300 according to an embodiment of the disclosure. The method 300 is illustrated as a logical flow diagram, in which each operation represents a sequence of operations that can be implemented in hardware, software, or a combination thereof. In the context of software, the operations can represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In this particular implementation, the method 300 may begin at block 302, where life-span information may be received, e.g., by the life-span model receiving module 218. Life-span information may include, but is not limited to, life-span models, such as left-censoring, right-censoring, and interval censoring, each of which may generate different results for predicting failures in power systems equipment. At block 304, a distribution model may be determined. In one embodiment, the distribution model may be a Weibull distribution, which may include distribution parameters such as Beta and Eta described above.

One or more failure times may be generated as a series of data points over time, e.g., by the accuracy determination module 220, at block 306. As described, such failure times may be based on information associated with historical failures that occurred in power systems equipment, in one embodiment. An outage distribution may be determined, e.g., by the accuracy determination module 220, at block 308. As described, the outage distribution may be based on design or manufacturer specifications that indicate a recommended time of inspection for power systems equipment, in one embodiment. At block 310, outage times may be generated as a series of data points representing times at which failures may occur, e.g., based on existing knowledge used to determine the outage distribution, in one embodiment.

At block 312, an input file for each of the life-span models received at block 302 may be generated, e.g., by the accuracy determination module 220. The input files may be used to calculate statistical parameters, such as those associated with a Beta value and an Eta value associated with a Weibull analysis, at block 314. The calculated statistical parameters for each life-span model may be compared to the statistical parameters associated with the distribution model determined at block 304 (e.g., the actual values), at block 316, to determine an accuracy for each of the life-span models, at block 318. As described, in one embodiment, the interval-censoring model may be determined to be the most accurate model. The interval-censoring model may include a Beta value that is below the determined (e.g., actual) Beta value, while the left-censoring model and the right-censoring model may include a Beta value that is above the actual Beta value, in one example. The interval-censoring model may also include a Beta value that is less than one percent difference from the actual Beta value, while the left-censoring model and the right-censoring model may include respective Beta values that are greater than one percent difference from the actual Beta value, in one example.

The stability of a life-span model may also be determined, e.g., via the stability determination module 222, at block 320. In one aspect of an embodiment, such a determination may include determining a stability of the distribution parameter, which may include determining an approach based at least in part on a type of failure of a part or component in a power system. Types of failures may include, but are not limited to, cracking in blades, walls, platforms, or pipes (as non-limiting examples), thermal barrier coating spallation, blade tip missing material, and excessive oxidation of major components. As described, whether a life-span model is stable may be determined by analyzing a percentage change in Beta values for the life-span models each time a failure start time is varied.

Life-span models that have a Beta value that varies by less than one percent may be considered stable, according to one embodiment.

Illustrative systems and methods for determining an accuracy and stability of life-span models are described above. Some or all of these systems and methods may, but need not, be implemented at least partially by configurations such as those described in FIGS. 1 and 2. It should be understood that certain acts in the methods may be rearranged, modified, and/or omitted entirely, depending on the circumstances. Also, any of the acts described above with respect to any method may be implemented by any number of processors or other computing devices based on instructions stored on one or more computer-readable storage media.

That which is claimed:

1. A system, comprising:

at least one memory that stores computer-executable instructions;

at least one processor configured to access the at least one memory, wherein the at least one processor is configured to execute the computer-executable instructions to:

receive at least one life-span model comprising a life-span model parameter associated with power systems equipment and store the at least one life-span model in the at least one memory, wherein the at least one life-span model comprises a complete-censored model, a right-censored model, a left-censored model, or an interval-censored model;

determine an accuracy of the at least one life-span model based at least in part on a statistical analysis;

determine a stability of the at least one life-span model, wherein the determination of the stability comprises comparing a Beta value of the life-span model parameter to one or more actual power systems equipment failure times;

generate a failure time for the power systems equipment;

determine an outage distribution based at least in part on at least one of the data or the generated failure time; and generate an outage time for the power systems equipment.

2. The system of claim 1, wherein the at least one life-span model is based at least in part on risk prediction data associated with the power systems equipment.

3. The system of claim 1, wherein the determination of the accuracy or the determination of the stability is based at least in part on a Monte Carlo simulation.

4. The system of claim 1, wherein the statistical analysis comprises a Weibull statistical analysis.

5. The system of claim 1, wherein the determination of the accuracy of the at least one life-span model comprises comparing the at least one life-span model against a theoretical model.

6. A method, comprising:

receiving, by an input device of a computing device, one or more life-span models each comprising a life-span model parameter associated with power systems equipment and storing the one or more life-span models in memory, wherein the one or more life-span models comprise a complete-censored model, a right-censored model, a left-censored model, or an interval-censored model;

determining, by at least one processor of the computing device, an accuracy of the one or more life-span models based at least in part on a statistical analysis;

determining, by the at least one processor of the computing device, a stability of each of the one or more life-span models, wherein determining the stability comprises comparing a Beta value of the life-span model parameter to one or more actual power systems equipment failure times;

generating, by the at least one processor of the computing device, a failure time for the power systems equipment;

determining, by the at least one processor of the computing device, an outage distribution based at least in part on at least one of the data or the generated failure time; and generating, by the at least one processor of the computing device, an outage time for the power systems equipment.

7. The method of claim 6, wherein the one or more life-span models are based at least in part on risk prediction data associated with the power systems equipment.

8. The method of claim 6, wherein the determining of the accuracy or the determining of the stability is based at least in part on a Monte Carlo simulation.

9. The method of claim 6, wherein the statistical analysis comprises a Weibull statistical analysis.

10. The method of claim 6, wherein determining the accuracy of the one or more life-span models comprises comparing the one or more life-span models against a theoretical model.

11. A method, comprising:

receiving, by at least one computer processor, from periodic inspection, life-span data associated with a part of a power system;

determining, by the at least one computer processor, a distribution model based at least in part on the data;

generating, by the at least one computer processor, an input file for a statistical analysis, wherein the input file comprises a complete-censoring input file, an interval-censoring input file, a left-censoring input file, a right-censoring input file, or not-censoring input file;

calculating, by the at least one computer processor, a statistical parameter based at least in part on the generated input file;

comparing, by the at least one computer processor, the calculated statistical parameter against the determined distribution model;

determining, by the at least one computer processor, an accuracy of the determined distribution model based at least in part on the comparison;

determining, by the at least one computer processor, a stability of the distribution model based at least in part on a comparison of a Beta value of the calculated statistical parameter to one or more actual power systems equipment failure times;

generating, by the at least one computer processor, a failure time for the part of the power system;

determining, by the at least one computer processor, an outage distribution based at least in part on at least one of the data or the generated failure time; and generating, by the at least one computer processor, an outage time for the part of the power system.

12. The method of claim 11, further comprising determining, by the at least one computer processor, a stability of the distribution parameter comprising determining an approach based at least in part on a type of failure of the part of the power system.

13. The method of claim 12, wherein determining, by the at least one computer processor, the stability of the distribution model further comprises, for a given set of initial parameters, comparing a first Beta of the distribution model against one or more additional Betas of the distribution model and, when the comparison yields a difference less than approximately 1%, recommending an interval censored model.

14. The method of claim 12, wherein determining, by the at least one computer processor, the stability of the distribution model further comprises, for a given set of initial parameters, comparing a first Beta of the distribution model against one or more additional Betas of the distribution model, when the comparison yields a difference greater than approximately 1% and a Beta converges as the given set of initial parameters increases, recommending the distribution model with at least one initial parameter associated with a converged Beta, and when the comparison yields a difference greater than approximately 1% and a Beta increases as the given set of initial parameters increases, determining a model with at least one of a pre-determined Beta or at a higher or lower level of initial parameters.

* * * * *